(12) United States Patent
Hoener et al.

(10) Patent No.: US 11,278,976 B2
(45) Date of Patent: Mar. 22, 2022

(54) METHOD FOR THE MANUFACTURE OF A GEAR COMPONENT, AND GEAR GRINDING MACHINE

(71) Applicant: ZF Friedrichshafen AG, Friedrichshafen (DE)

(72) Inventors: Franz-Josef Hoener, Alsting (FR); Frank Klein, Heusweiler (DE); Thomas Barrois, Saarbrücken (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/912,140

(22) Filed: Jun. 25, 2020

(65) Prior Publication Data

US 2020/0406382 A1    Dec. 31, 2020

(30) Foreign Application Priority Data

Jun. 26, 2019   (DE) ...................... 10 2019 209 201.2

(51) Int. Cl.
| | |
|---|---|
| *B23F 1/02* | (2006.01) |
| *B23F 5/04* | (2006.01) |
| *B23P 15/14* | (2006.01) |
| *B23F 5/02* | (2006.01) |
| *B23F 17/00* | (2006.01) |

(52) U.S. Cl.
CPC ............... *B23F 1/026* (2013.01); *B23F 5/04* (2013.01); *B23P 15/14* (2013.01); *B23F 1/023* (2013.01); *B23F 5/02* (2013.01); *B23F 17/00* (2013.01)

(58) Field of Classification Search
CPC ............. B23F 1/023; B23F 5/04; B23F 17/00
See application file for complete search history.

(56) References Cited

U.S. PATENT DOCUMENTS 4,559,744 A * 12/1985 Wirz ....................... B23F 1/023
                                                        451/5
4,561,216 A * 12/1985 Miyatake ................. B23F 5/04
                                                        409/15

(Continued)

FOREIGN PATENT DOCUMENTS

DE         3704607 A1    8/1988
DE    102008035525 B3   12/2009

(Continued)

OTHER PUBLICATIONS

DE-102016010893-A1 Machine Translation (Year: 2018).*

(Continued)

*Primary Examiner* — Jacob J Cigna
*Assistant Examiner* — Michael W Hotchkiss
(74) *Attorney, Agent, or Firm* — Dority & Manning, P.A.

(57) ABSTRACT

A method for the manufacture of a gear component includes, in a soft machining process, introducing a preliminary toothing 3 with a machining allowance 7 that is fixed relative to a final toothing 4 into a blank such that a semi-finished part 2 is produced. The method also includes, in a fine machining process, removing the machining allowance 7 and producing the final toothing 4 of the toothed component. The machining allowance 7 is removed in a single-stage hobbing method by a grinding tool 1, wherein the grinding tool 1 removes the machining allowance completely in a single stroke movement H.

11 Claims, 2 Drawing Sheets

(56) References Cited

U.S. PATENT DOCUMENTS

| | | | | | |
|---|---|---|---|---|---|
| 4,850,155 | A | * | 7/1989 | Sulzer | B23F 5/04 451/47 |
| 4,961,289 | A | * | 10/1990 | Sulzer | B23F 5/04 409/11 |
| 6,752,695 | B2 | * | 6/2004 | Schmid | B23F 5/04 451/10 |
| 7,682,222 | B2 | * | 3/2010 | Baldeck | B23F 23/006 451/11 |
| 8,113,915 | B2 | * | 2/2012 | Jankowski | B23F 23/1231 451/47 |
| 8,147,296 | B2 | * | 4/2012 | Lopez | B23F 23/1225 451/56 |
| 8,313,357 | B2 | * | 11/2012 | Heyder | B24B 19/022 451/10 |
| 9,393,631 | B2 | * | 7/2016 | Grinko | B23F 15/08 |
| 10,016,829 | B2 | | 7/2018 | Mundt | |
| 10,112,246 | B2 | * | 10/2018 | Landi | B23F 5/04 |
| 10,500,657 | B2 | * | 12/2019 | Wuerfel | G05B 19/404 |
| 10,569,349 | B2 | | 2/2020 | Wuerfel | |
| 10,603,730 | B2 | | 3/2020 | Wuerfel | |
| 2015/0202705 | A1 | * | 7/2015 | Bittner | F16H 55/17 74/457 |
| 2015/0290730 | A1 | * | 10/2015 | Grinko | B23F 5/22 451/47 |
| 2017/0120358 | A1 | * | 5/2017 | Landi | B23F 5/04 |
| 2018/0238419 | A1 | | 8/2018 | Glaser | |
| 2020/0384557 | A1 | * | 12/2020 | Grinko | C21D 9/32 |

FOREIGN PATENT DOCUMENTS

| | | | | |
|---|---|---|---|---|
| DE | 102015209917 | A1 | | 12/2016 |
| DE | 102015008962 | A1 | | 1/2017 |
| DE | 102015009287 | A1 | | 1/2017 |
| DE | 102016005257 | A1 | | 11/2017 |
| DE | 102016008991 | A1 | * | 1/2018 ............... B23F 1/02 |
| DE | 102016010893 | A1 | * | 3/2018 ........... B24B 53/075 |
| DE | 102017001652 | A1 | | 8/2018 |
| DE | 102018131041 | A1 | | 6/2019 |

OTHER PUBLICATIONS

DE-102016008991-A1 Machine Translation (Year: 2018).*
German Search Report DE102019209201.2, dated Apr. 17, 2020. (16 pages).
Klocke, Fritz: Fertigungsverfahren 2. Berlin: Springer Vieweg, 2017, pp. 146, 147, 168, 169 Y. ISBN 978-3-662-53310-9.
DIN EN 10083: Vergütungsstähle—Teil 1: Allgemeine technische Lieferbedingungen (Compensation steels—Part 1: General technical terms of delivery); Deutsche Norm DIN EN 10083-1. Deutsche Fassung EN 10083-1:2006. Oct. 2006. pp. 1-27.
DIN EN 10084: Einsatzstähle—Technische Lieferbedingungen (Insert steels—Technical terms of delivery); Deutsche Norm DIN EN 10084. Deutsche Fassung EN 10084:2008. Jun. 2008. pp. 1-40.

* cited by examiner

METHOD FOR THE MANUFACTURE OF A GEAR COMPONENT, AND GEAR GRINDING MACHINE

CROSS-REFERENCE TO RELATED APPLICATION

The present application is related and has right of priority to German Patent Application No. 10 2019 209 201.2 filed on Jun. 26, 2019, which is incorporated by reference in its entirety for all purposes.

FIELD OF THE INVENTION

The invention relates to a method for the manufacture of a gear component. The invention relates further to a gear grinding machine for carrying out the method.

BACKGROUND

In the manufacture of gears, a workpiece to be machined conventionally passes through a multi-stage process chain, which includes at least soft machining and subsequent hard-fine machining. Soft machining produces a preliminary toothing and hard-fine machining produces a final shape. Different methods of hard-fine machining are known, such as, for example, honing or hobbing, wherein in the case of hobbing in particular, the workpiece is generally machined in a two-stage grinding process which is composed of a roughing stroke and a finishing stroke.

Publication DE 10 2008 035 525 B3 discloses a method for producing a workpiece with a cylindrical basic shape on whose outer circumference there is arranged a helical profile, in particular for producing a screw compressor rotor, which includes: a) preliminary machining of the workpiece by introduction of the profile with a machining allowance relative to the final shape, b) preliminary grinding of the profile in a rough-machining operation in a grinding machine, in which a portion of the machining allowance is removed, and c) finish-grinding of the profile in a finishing operation in the grinding machine, in which the remainder of the machining allowance is removed and the final shape of the profile is produced, wherein the preliminary grinding and/or the finish-grinding is carried out with a helical grinding tool by the continuous hobbing method.

SUMMARY OF THE INVENTION

Example aspects of the invention provide a method of the type mentioned at the beginning which is distinguished by the cost-efficient manufacture of gear components with a reduced cycle time and with a consistent quality, in particular with a consistent quality in terms of metallographic and also gear-geometry properties. Example aspects of the invention also provide a corresponding gear grinding machine for carrying out the method.

Example aspects of the invention provide a method which is suitable for the manufacture of a gear component. In particular, the gear component to be manufactured is a gear wheel, preferably a planetary wheel.

In a first step of the method, a preliminary toothing is introduced into a blank in a soft machining process. In particular, the preliminary toothing is introduced into the blank by cutting, preferably with a geometrically defined cutting edge. Preferably, the preliminary toothing is defined by the introduction into the blank of a tooth gash geometry which has a near-net-shape form. Particularly preferably, the blank has a cylindrical basic shape, wherein the preliminary toothing is introduced into a lateral surface of the blank. In particular, the workpiece provided with the preliminary toothing will be referred to hereinbelow as a semi-finished part.

The preliminary toothing has a machining allowance that is fixed relative to a final toothing. In particular, the machining allowance is defined as a post-machining layer which is removed in a subsequent process. Preferably, the machining allowance is provided only at tooth flanks of the preliminary toothing, wherein a tooth base of the preliminary toothing is already machined to the final shape after the soft machining process. Particularly preferably, a protuberance is produced in the soft machining process in a tooth root region, in particular at the tooth base and/or at the tooth root, whereby the formation of steps and/or cracks in the tooth root region on removal of the machining allowance is prevented. Protuberance is to be understood as meaning a rounding and/or an undercut in the tooth root region. The quality, in particular the machining allowance, of the preliminary toothing is especially chosen so that subsequent fine machining is not impaired and/or can be carried out economically. Particularly preferably, the machining allowance is to be chosen as small as possible.

In a further step, the machining allowance is removed in a fine machining process, in particular by hard-fine machining, and the final toothing of the gear component is produced. In particular, the fine machining process serves to compensate for production-related dimensional and shape deviations which are the result of the preceding processes, to completely remove the thermally affected edge layer of the component resulting from the preceding processes, and to achieve a high surface quality. Preferably, the machining allowance is removed by cutting, preferably with a geometrically undefined cutting edge. In the fine machining process, preferably only the machining allowance at the tooth flanks is removed, wherein machining at the tooth base is dispensed with. The final toothing can be in the form of, for example, straight toothing or helical toothing, for example involute or cycloidal toothing.

Within the scope of example embodiments of the invention, it is proposed that the machining allowance is removed in a single-stage hobbing method by a grinding tool. In particular, the machining allowance is removed evenly in a single-stage hobbing method by continuous hobbing. Preferably, the grinding tool is in the form of a rotating grinding tool, which rotates about a tool rotational axis during operation. Preferably, the grinding tool has a geometrically undefined cutting edge which is formed by a plurality of bonded abrasive grains whose edges function as cutting edges. In the fine machining process, chip removal takes place on the basis of a relative movement between the grinding tool and the semi-finished part to be machined, in that the relatively rigid abrasive grain penetrates the post-machining layer of the tooth flanks on a predetermined path and removes the machining allowance. The grinding tool thereby removes the machining allowance completely in a single stroke movement. In particular, the stroke movement is a grinding stroke, in which the grinding tool is displaced parallel to the semi-finished part to be machined. In particular, the single-stage hobbing method describes machining of the semi-finished part in one stroke with constant control variables and consequently also a constant chip volume. The single-stroke hobbing method requires a strictly defined geometric state of the semi-finished part, which is produced in particular in the soft machining process and also by the hardening process which may be chosen.

The advantage of example aspects of the invention is that, as a result of the single-stage hobbing method with only one grinding stroke, the grinding time can be significantly reduced while the geometric gear quality remains at least constant. As a result, the gear components can be manufactured more cost-efficiently. In addition, the load on the grinding tool can be significantly reduced and thus the service life of the grinding tool can be significantly increased. Furthermore, more efficient and more economical process management can be implemented as compared with the prior art. A further advantage is that the thermal influence at the edge zones is reduced, whereby the quality of the gear component is improved.

In a concrete example embodiment, it is provided that the grinding tool is operated in a counter-direction grinding mode during the stroke movement. In particular, the grinding tool removes the machining allowance in counter-direction mode similarly to finish-machining, wherein the cutting edges of the grinding tool penetrate the post-machining layer approximately tangentially with respect to a target geometry defining the final toothing and leave the post-machining layer again at a surface of the post-machining layer. In particular, counter-direction grinding serves the purpose of final or finish-machining, wherein the final toothing is produced by the counter-direction grinding. It can, however, also be provided that counter-direction grinding is followed by a further manufacturing step, such as, for example, polishing.

Since in counter-direction mode the abrasive grain already penetrates the post-machining layer at the finished-dimension depth and chip removal there is thus slight, a better surface quality can be achieved with this grinding mode than with a same-direction grinding mode. In addition, as a result of the relatively low mean material removal rate that is associated with the reduced machining allowance, a critical heat input in the edge zone can be avoided.

In a further example implementation, it is provided that a machining allowance of not more than fifty micrometers (50 μm) is produced in the soft machining process. In particular, the machining allowance is less than fifty micrometers (50 μm), preferably less than forty micrometers (40 μm), especially less than thirty micrometers (30 μm). Alternatively or optionally in addition, the machining allowance is more than thirty micrometers (50 μm), preferably more than thirty-five micrometers (35 μm), especially more than forty-five micrometers (50 μm).

By reducing the machining allowance and thus also the necessary infeed of the grinding tool, the grinding process can thus be influenced directly via a characteristic grind size.

In a preferred example embodiment, the grinding tool is in the form of a grinding worm. In particular, the grinding worm is in the form of a multiple-thread, preferably at least triple-thread, grinding worm. In principle, the grinding worm can include corundum (Al2O3), silicon carbide (SiC) or synthetic diamond as the abrasive material. Preferably, the grinding worm includes cubic boron nitride (CBN) as the abrasive material. The abrasive grains can especially be in the form of ceramic-bonded corundum abrasive grains or in the form of metal- or ceramic-bonded CBN abrasive grains. Preferably, the abrasive grain has a triangular or rod-like shape.

According to this example embodiment, the machining allowance is removed by rolling kinematics between the grinding tool and the semi-finished part. In particular, the grinding worm and the semi-finished part roll in one another analogously to a worm gear, wherein the worm corresponds to the grinding worm and the worm wheel corresponds to the semi-finished part. Preferably, rolling feed is obtained by a rotational rolling component performed by the semi-finished part and a translational rolling component performed by the grinding worm.

By configuring the grinding tool as a grinding worm, a very high material removal rate can be achieved. In addition, as a result of the configuration as a multiple-thread grinding worm, multiple tooth flanks can be ground at the same time, whereby the machining time is shortened and the risk of overheating when grinding is reduced owing to the significantly shorter contact time of an individual abrasive grain.

In a further example form of the invention, it is provided that the semi-finished part to be machined is rotated about a workpiece axis, in particular during the fine machining process, wherein the stroke movement is implemented as a movement directly axially with respect to the workpiece axis. In particular, the stroke movement is a linear movement parallel to the workpiece axis. Preferably, the stroke movement is carried out at least over the entire tooth width of the preliminary toothing. During the machining operation, the semi-finished part rotates about the workpiece axis and the grinding tool rotates about an associated tool axis, wherein during the machining operation the grinding tool performs the stroke movement and the semi-finished part remains stationary.

Accordingly, as a result of the stroke movement, machining can be carried out in the entirety of the stroke movement over the entire tooth width of the preliminary toothing, so that the final toothing is produced after exactly one complete grinding stroke.

In a further example development, it is provided that the grinding tool is fed to the semi-finished part in an infeed movement, wherein the infeed movement takes place perpendicularly to the workpiece axis. In particular, the infeed movement takes place radially with respect to the semi-finished part, wherein the grinding tool is brought into engagement with the preliminary toothing during the infeed movement.

It is further provided that the grinding tool is moved in a shift movement relative to the semi-finished part before, during or after the stroke movement, wherein the shift movement takes place tangentially with respect to the rotating semi-finished part. In particular, the shift movement takes place simultaneously with or sequentially to the stroke movement. In order to implement the shift movement, the grinding tool is especially displaced by a firmly defined amount either after each machined part or only when a specific degree of wear has been reached. Preferably, a shift increment is dispensed with in the single-stage hobbing method.

As a result of the shift movement, the degree of utilization of the grinding worm and thus the service life can be improved further. In addition, heating of the tool is more even, so that the heat input at the edge zones can be reduced further.

In a further concrete example embodiment, it is provided that the preliminary toothing is introduced into the blank in the soft machining process by a single- or multi-stage hobbing method. In particular, the preliminary toothing is introduced into the blank by axial, radial, radial-axial, tangential or diagonal hobbing. For this purpose, a rotating hobbing tool can be operated either in same-direction mode or in counter-direction mode. The cutting movement is thereby composed of a rotation of the milling tool and a superposed feed movement. The preliminary toothing can be introduced into the blank especially by two-stroke machining, also known as two-cut machining, wherein rough-machining is performed on one stroke and finish-machining is performed on a return stroke. For example, the milling tool can be operated in same-direction mode for rough-machining and in counter-direction mode for finish-machining.

Accordingly, it is a consideration of example aspects of the invention to propose a method which is distinguished by a particularly versatile and simple soft machining process.

In a further example implementation of the invention, it is provided that the semi-finished part is hardened by a hardening method after the soft machining process and/or before the fine machining process. In particular, the semi-finished part is hardened by case hardening according to DIN EN 10084. Preferably, the semi-finished part is case-hardened by a low-pressure or high-pressure method. In principle, a heat-treatable steel according to DIN EN 10083 can be used as the material for the gear component. Preferably, however, a case-hardened steel according to DIN EN 10084 is used as the material for the gear component. In the subsequent fine machining process, as small an amount of the hardened edge layer as possible is removed, in particular at the tooth flanks, while at the same time the requirements in terms of geometry and surface are met, wherein for this purpose the machining allowance, as already described, is chosen correspondingly small.

As a result of the hardening of the semi-finished part, a method is proposed which is distinguished by increased wear strength and flank load-carrying capacity, while at the same time the toughness in the component core of the gear component is high. Preferably, the method for hardening is in the form of a low-distortion method.

In an alternative or optionally additional example implementation, it is provided that the semi-finished part is deburred in a deburring process after the soft machining process. In particular, the deburring process serves to remove the burr that remains on the preliminary toothing as a result of milling and to round the edges of the preliminary toothing. In particular, deburring of the semi-finished part is carried out by electrochemical deburring. Preferably, the deburring process is positioned in the process chain between the soft machining process and the hardening process.

Accordingly, a method is proposed which, owing to the deburring process, is distinguished in that machining of the semi-finished part in the subsequent fine machining process is particularly gentle on the tool. The service life of the grinding tool can accordingly be improved further.

In a further example concretization, it is provided that the grinding tool is dressed in a two-stage dressing process by a dressing tool. There is used for this purpose in particular a rotating dressing tool which is brought into engagement with the profile of the grinding tool. The dressing tool can be in the form of a profile roller or a shaping roller or a dressing wheel. Particularly preferably, the dressing tool is in the form of a multi-groove, in particular triple-groove, full-profile roller. Preferably, the rotational movement in the dressing process is superposed with a radial feed movement. If the dressing tool does not cover the full width of the grinding tool, a lateral feed of the dressing tool is additionally necessary.

According to this example embodiment, the grinding tool is profiled in a first stage and the grinding tool is sharpened in a second stage. In particular, a rough geometry of the grinding tool is restored in the first stage. In particular, the desired geometry as well as the surface of the grinding tool are produced in the second stage.

For example, the geometry of the grinding tool can be restored in the first stage in up to nine strokes, wherein an optimal grinding worm surface for grinding is produced in the second stage in up to two strokes.

In a further concrete further example development, the grinding tool is operated in a same-direction dressing mode in a dressing movement. A more streamlined topography of the grinding tool is thereby to be produced. Although the attainable surface quality of the component is thereby impaired, the rougher surface of the grinding tool results in lower heat generation. The negative effect on the surface quality can particularly preferably be compensated for by changing the speed ratio in the grinding operation from the same-direction mode to the counter-direction mode of the grinding tool.

Example aspects of the invention further provide a gear grinding machine which is configured and/or suitable for implementing a fine machining process with a grinding tool on a semi-finished part, wherein the semi-finished part has a preliminary toothing with a machining allowance that is fixed relative to a final toothing. In particular, the gear grinding machine serves to carry out the fine machining process and/or the dressing process according to example aspects of the method described hereinbefore. The gear grinding machine has for this purpose a control device, wherein the control device is configured to control the grinding tool in a single-stage hobbing method for complete removal of the machining allowance of the semi-finished part in a single stroke movement, so that a final toothing of a gear component is produced.

BRIEF DESCRIPTION OF THE DRAWINGS

Further features, advantages and effects of the invention will become apparent from the following description of preferred exemplary embodiments of the invention, in which.

DETAILED DESCRIPTION

Figure 1:
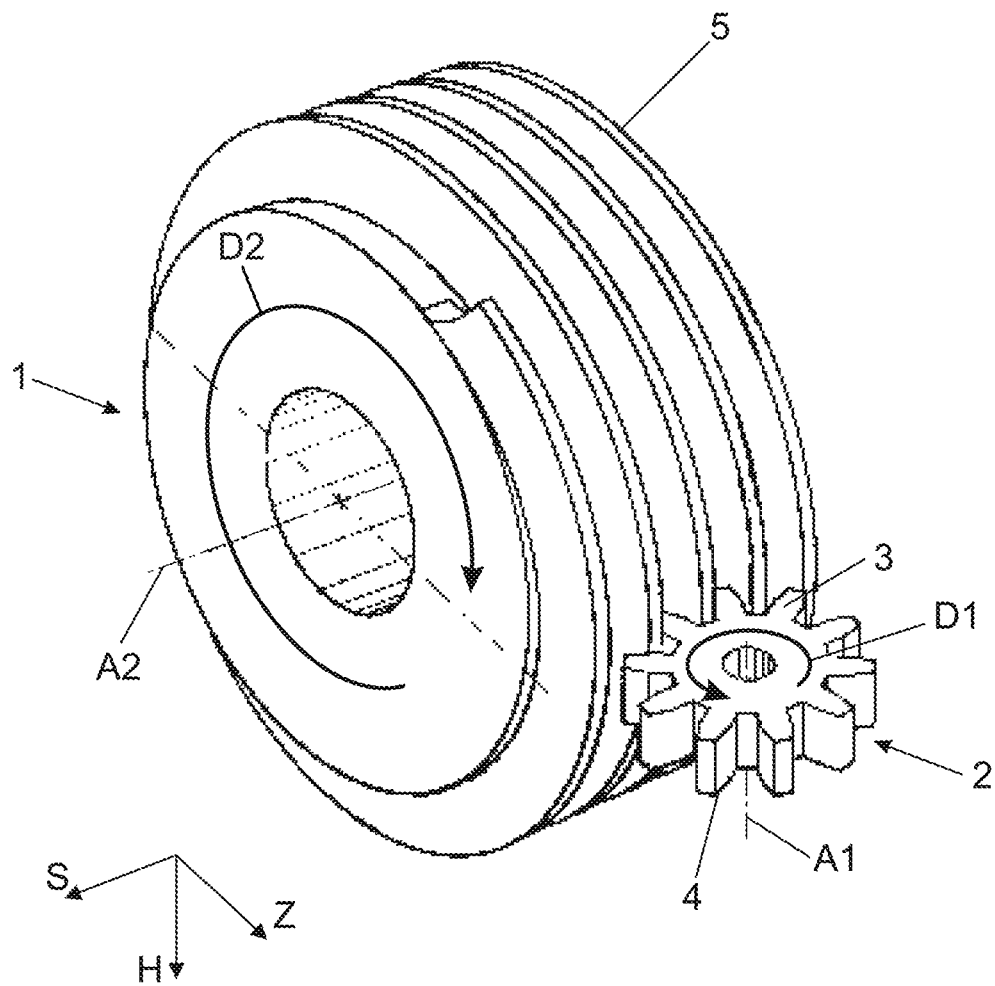
FIG. 1 is a schematic representation of a grinding tool and of a workpiece to be machined as an exemplary embodiment of the invention.
Figure 2:
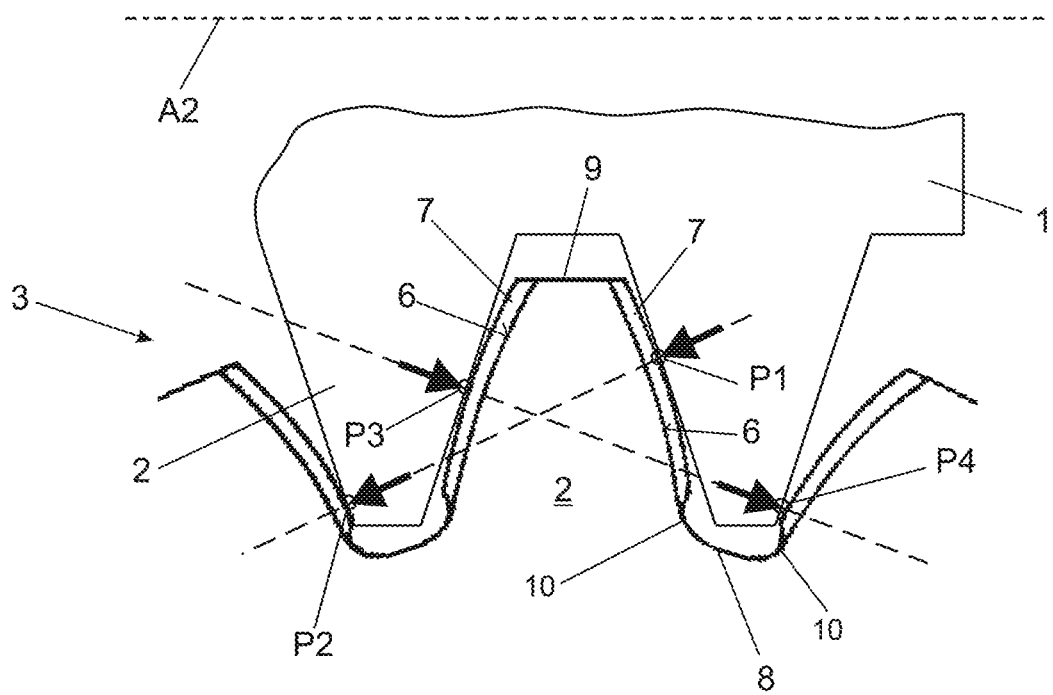
FIG. 2 is a detail view of a region of engagement between the grinding tool and the workpiece.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows, in a schematic representation, a grinding tool 1 for a gear grinding machine, not shown, and a workpiece 2 to be machined—referred to hereinbelow as a semi-finished part—in the form of a gear wheel, for example a planetary wheel. In the exemplary embodiment shown, a fine machining process is represented, wherein the semi-finished part 2 has already previously been subjected to a soft machining process, as a result of which the semi-finished part 2 already has a circumferential preliminary toothing 3. In the soft machining process, the preliminary toothing 3 is introduced into a cylindrical blank, not shown, by hobbing. For example, the preliminary toothing 3 is a near-net-shape tooth gash geometry which has been introduced into the lateral surface of the blank and is machined to the final shape in the fine machining process.

Optionally, the semi-finished part 2 can additionally have been subjected to a deburring process and/or a hardening process after the soft machining process and before the fine machining process. For example, the deburring process follows the soft machining process, wherein the semi-finished part 2 provided with the preliminary toothing 3 is deburred in the deburring process. For example, deburring is carried out by an electrochemical deburring process. For example, the hardening process follows the soft machining process or the deburring process, wherein the semi-finished part 2 is hardened in the hardening process. For example, the semi-finished part 2 can be hardened by case hardening.

In the subsequent fine machining process, the preliminary toothing 3 is machined by the grinding tool 1 in such a way that a final toothing 4 of a finished gear component is produced. In the exemplary embodiment shown, the grinding tool 1 is in the form of a multiple-thread grinding worm, which has on an outer periphery of the grinding tool 1, a screw profile 5 which comes into engagement with the preliminary toothing. Machining of the preliminary toothing 3 thereby takes place by continuous hobbing, wherein the final toothing 4 is produced by cutting by continuous rolling of the screw profile 5 in the preliminary toothing 3 to be machined.

During the fine machining process, the semi-finished part 2 is rotated about a workpiece axis A1 and the grinding tool 1 is rotated about a tool axis A2. In an infeed movement Z, the grinding tool 1 is fed to the semi-finished part 2 at the start of the fine machining process, wherein the screw profile 5 is brought into engagement with the preliminary toothing 3. The infeed movement Z takes place in a direction directed radially towards the semi-finished part 2.

During hobbing, the grinding tool 1 and the semi-finished part 2 roll in one another analogously to a worm gear, wherein the worm corresponds to the grinding tool 1 and the worm wheel corresponds to the semi-finished part 2. The rolling feed is obtained by a rotational rolling component performed by the semi-finished part 2 and a translational rolling component performed by the grinding tool 1. In addition, the grinding tool 1 is moved in a stroke movement H relative to the semi-finished part 2, wherein the stroke movement H is carried out as an axial movement in relation to the workpiece axis A1. The preliminary toothing 3 of the semi-finished part 2 is thereby machined in an entirety of the preliminary toothing 3 over the entire tooth width in only a single stroke movement H. However, it may be a requirement for this process design that all the control variables are precisely matched, so that the requirements for very high surface qualities are met and a damage-free metallographic state is ensured. For this purpose, a strictly defined geometric state of the preliminary toothing 3 may be required, which is produced by the soft machining and subsequent hardening.

During the grinding operation, the semi-finished part 2 rotates in a workpiece rotational direction D1 about the workpiece axis A1 and the grinding tool 1 rotates in a tool rotational direction D2 about its tool axis A2. Machining by the grinding tool 1 thereby takes place in a so-called counter-direction mode, wherein a feed speed vector of the semi-finished part 2 and a vector of the cutting speed of the grinding tool 1 are in opposite directions. In other words, the stroke movement H and the tool rotational direction D2 of the grinding tool 1 are in the same direction.

In addition, the grinding tool 1 can be moved tangentially with respect to the semi-finished part 2 via a shift movement S. For example, the shift movement is a movement oriented in an axial direction in relation to the tool axis A2. The shift movement S can be carried out before, during or after the stroke movement H. Via the shift movement S, the degree of utilization of the grinding tool 1 and thus the service life thereof can be improved. For example, the shift movement S can be carried out continuously during hobbing. Alternatively, the shift movement S can, however, also be carried out after the machining of one or more semi-finished parts 2 or when a specific degree of wear has been reached.

FIG. shows in a detail view a region of engagement between the grinding profile 5 of the grinding tool 1 and the preliminary toothing 3 of the semi-finished part 2. In continuous hobbing, the high overlap between the grinding tool 1 and the workpiece 2 results in increasingly more contact points P1 through P4 which are simultaneously in engagement. The two contact points P1, P2 are always on a first line of engagement L1 and the two contact points P3, P4 are always on a second line of engagement L2 between the grinding tool 1 and the workpiece 2.

The preliminary toothing 3 has at tooth flanks 6 a machining allowance 7, which is removed by the grinding tool 1 in the scope of the fine machining process, so that the final toothing 4 is produced. The machining allowance 7 is provided at the tooth flanks 6, wherein the tooth base 8 and the tooth tip 9 of the preliminary toothing 3 are already machined to the final shape after the soft machining process.

Within the context of the fine machining process, the single-stage hobbing method describes the machining of the semi-finished part 2 in one stroke with constant control parameters and consequently also a constant chip volume. The single-stage hobbing method is distinguished by a time saving, lower tool loading and, as a result, increased efficiency. By reducing the machining allowance 7, the efficiency of the fine machining process is to be increased further, while at the same time the level of quality in terms of the geometric and metallographic properties is to be raised.

Because the machining allowance 7 is one of the most important main influencing factors on the material removal rate, the material removal rate can be reduced significantly by reducing the tooth flank machining allowance. For example, the machining allowance is reduced to at least or exactly forty-five thousandths of a millimeter (0.045 mm). The machining allowance 7, and the machining by the grinding tool 1, is thereby limited to the hardened tooth flanks 6, since only they come into contact with corresponding counter-flanks in a later installation situation.

The preliminary toothing 3 additionally has a protuberance in a tooth root region 10, which is formed by a rounding or an undercut in the tooth root region 10. The formation of steps and/or cracks in the tooth root region 10 on removal of the machining allowance 7 is thereby prevented. Moreover, in the fine machining process, machining of the tooth base 8 by the grinding tool 1 is additionally dispensed with. The grinding tool 1 does not contact the rounding in the tooth root region 10 on removal of the machining allowance 7, whereby machining in the tooth base 8 is avoided.

In the fine machining process, the machining allowance 7 is removed on the stroke movement H comparably to finish-machining, which takes place in the counter-direction mode described above, in order to achieve as high a surface quality as possible.

Moreover, the grinding operation can additionally be influenced by the choice of an abrasive grain of the grinding worm. For example, the abrasive grain takes the form of small triangles, for example so-called 3M Precision-Shaped Grain (PSG). The material removal rate, and thus also the economy of the process, can accordingly be increased further.

Furthermore, in a dressing process, not shown, the grinding tool 1 can be provided with a more streamlined topography by dressing in a same-direction dressing mode, whereby, although the attainable surface quality of the component is impaired, lower heat generation can be produced. Heat input into the edge zones of the tooth flanks 6 can accordingly be reduced. The negative effect on the surface quality can be compensated for again by the counter-direction machining of the semi-finished part 2 in the fine machining process, so that an improved grinding process in terms of heat input and surface quality is realized.

For example, the fine machining process can be modified via further control parameters such as, for example, a higher feed of the stroke movement and/or higher cutting speeds. A requirement therefor, in addition to a stable design of the grinding process over the entire tool service life, is a capable and stable process chain from soft machining through hardening to continuous hobbing, so that fluctuations of the machining allowance 7 that exceed tolerances are avoided where possible.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS

1 grinding tool
2 semi-finished part (workpiece)
3 preliminary toothing
4 final toothing
5 grinding profile
6 tooth flanks
7 machining allowance
8 tooth base
9 tooth tip
10 tooth root region
A1 workpiece axis
A2 tool axis
D1 workpiece rotational direction
D2 tool rotational direction
L1, L2 lines of engagement
P1-P4 contact points
H stroke movement
S shift movement
Z infeed movement

The invention claimed is:

1. A method for the manufacture of a gear component, such as a gear wheel, comprising:

in a soft machining process, introducing a preliminary toothing (3) having a machining allowance (7) that is fixed relative to a final toothing (4) into a blank such that a semi-finished part (2) is produced; and in a fine machining process, removing the machining allowance (7) and producing the final toothing (4) of the gear component, wherein the machining allowance (7) is removed in a single-stage hobbing method by a grinding tool (1), and the grinding tool (1) removes the machining allowance completely in a single stroke movement (H), wherein, in the soft machining process, the machining allowance (7) is produced with a value less than fifty micrometers, wherein the grinding tool (1) comprises abrasive grains that remove the machining allowance (7) and produce the final toothing (4) of the gear component during the single stroke movement (H), wherein the grinding tool (1) removes the machining allowance (7) simultaneously from both flanks of each tooth of the preliminary toothing (3) during the single stroke movement (H), and wherein the semi-finished part (2) is rotated about a workpiece axis (A1) during the fine machining process, and the single stroke movement (H) is substantially parallel to the workpiece axis (A1).

2. The method of claim 1, wherein the grinding tool (1) is operated in a counter-direction grinding mode during the single stroke movement (H).

3. The method of claim 1, wherein the grinding tool (1) is a grinding worm, and the machining allowance (7) is removed by rolling kinematics between the grinding tool (1) and the semi-finished part (2).

4. The method of claim 1, wherein the preliminary toothing (3) is introduced into the blank in the soft machining process by hobbing.

5. The method of claim 1, wherein the semi-finished part (2) is hardened in a hardening process after the soft machining process.

6. The method of claim 1, wherein the semi-finished part (2) is deburred in a deburring process after the soft machining process.

7. The method of claim 1, wherein the grinding tool (1) is dressed in a two-stage dressing process by a dressing tool, and the grinding tool (1) is profiled in a first stage and ground in a second stage.

8. The method of claim 7, wherein the dressing of the grinding tool (1) takes place in a same-direction dressing mode.

9. The method of claim 1, wherein the semi-finished part (2) to be machined is rotated about a workpiece axis (A1), and the stroke movement (H) takes place axially with respect to the workpiece axis (A1).

10. The method of claim 9, wherein the grinding tool (1) is fed to the semi-finished part (2) in an infeed movement (Z), and the infeed movement (Z) takes place perpendicularly to the workpiece axis (A1).

11. The method of claim 10, wherein the grinding tool (1) is moved in a shift movement (S) relative to the semi-finished part (2) before, during, or after the stroke movement (H), and the shift movement (S) takes place tangentially with respect to the rotating semi-finished part (2).

* * * * *